March 20, 1945. A. H. NATHO 2,372,107
HANDLE FOR JARS
Filed Aug. 30, 1944
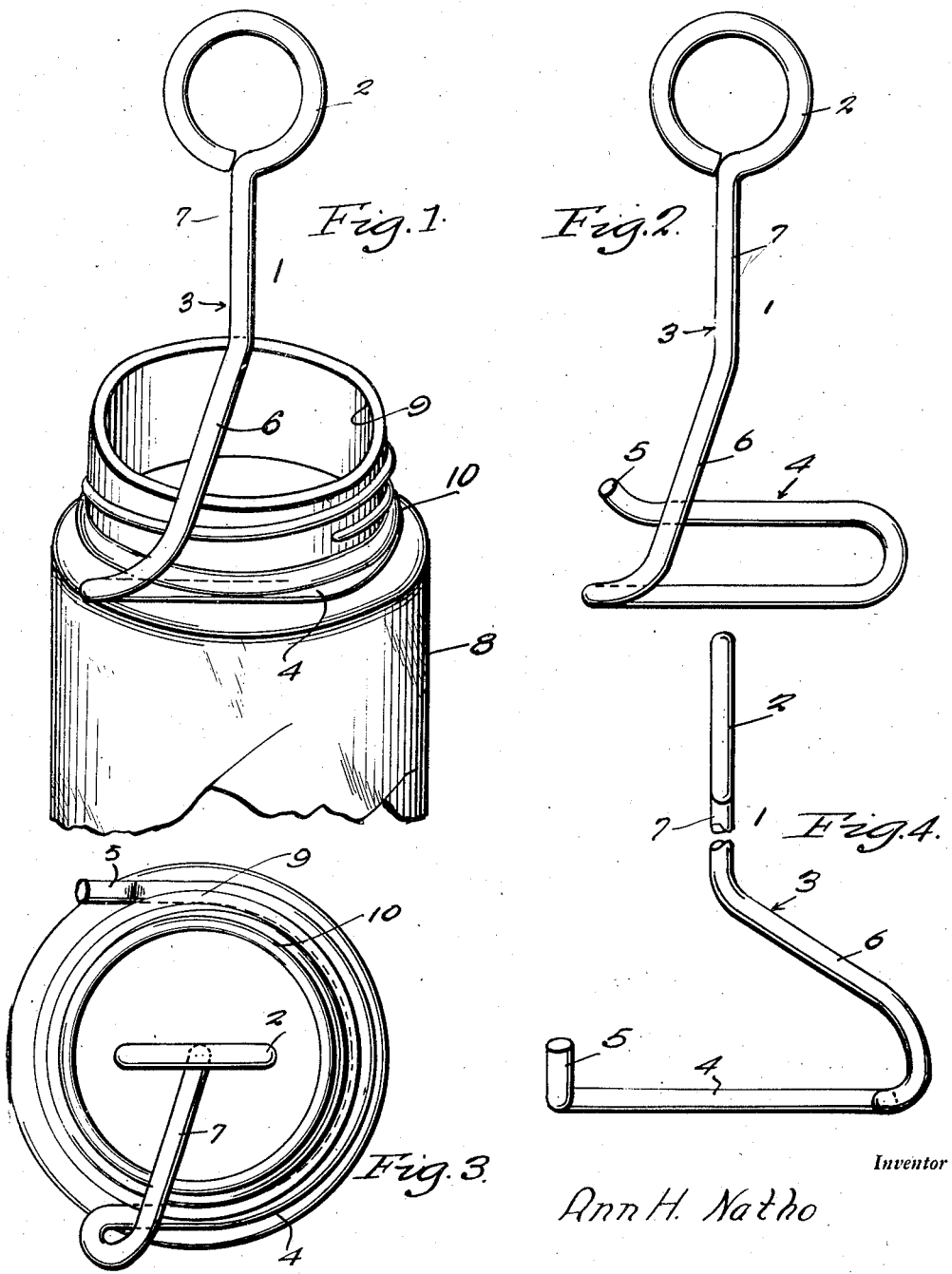
Inventor
Ann H. Natho
By Clarence A. O'Brien
and Harvey B. Jacobson
Attorneys Patented Mar. 20, 1945

2,372,107

UNITED STATES PATENT OFFICE 2,372,107

HANDLE FOR JARS

Ann H. Natho, Lockport, La.

Application August 30, 1944, Serial No. 551,921

1 Claim. (Cl. 294—27)

My invention relates to improvements in handles for jars and the like.

The invention is designed with the primary object in view of providing a simply constructed, inexpensive handle particularly adapted for easy, quick and secure attachment to jars having flanged necks, and whereby such jars may be safely and easily lifted out of boiling water, as, for instance, in canneries, and from pressure cookers or the like.

To the accomplishment of the foregoing, and subordinate objects presently appearing, a preferred embodiment of my invention has been illustrated in the accompanying drawing, set forth in detail in the succeeding description, and defined in the claims appended hereto.

In said drawing:

Figure 1 is a view in perspective illustrating my improved handle, in its preferred embodiment, applied to the neck of a jar, Figure 2 is a view in perspective of the handle, Figure 3 is a view in top plan with the handle applied, Figure 4 is a view in side elevation of the handle.

Reference being had to the drawing by numerals, my improved handle 1, as illustrated, comprises a single piece of rod metal bent upon itself to form an eye-like, upper, hand-grip end 2, a shank 3 depending from said end 2, and a lower end, lateral, loop 4 of U shape.

The loop 4 terminates, at one end, in a tip 5 curving upwardly. The shank 3 has a lower portion 6 inclining upwardly from the other end of the loop 4, and inwardly of said loop, and an upper portion 7 which together with the hand-grip end 2 is centered above the loop 4 and perpendicular to the plane of said loop, so that a jar carried in the loop 4, as at 8, will be centered vertically with the portion 7 and hand-grip end 2, and the weight of the jar 8 will not tend to cause the handle 1 and the jar 8 to swing out of the perpendicular when a vertical lift is imparted to the handle. The loop 4 is of the approximate size to straddle the usual neck 9 of the jar 8 below the usual bead 10 of said neck, and to snugly fit the neck below said bead. The curved tip 5 functions, by engagement with the bead 10, if the loop is accidentally pulled part way off the neck 9, to bind against said bead and prevent the loop 4 from sliding completely off the neck 9.

The manner in which the described handle 1 is designed to be applied, or attached, will be apparent. The loop 4 is applied over the neck 9 by merely slipping the same onto said neck, and that operation may be conveniently and easily accomplished by swinging the handle 1 by means of the hand-grip end 2.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A handle for a jar having a neck provided with a circumferential bead, said handle comprising a single piece of rod-like metal bent upon itself and including an eye-like upper hand-grip end, a shank depending from said hand-grip end, and a lower end lateral loop of substantially the same size as the neck of the jar and adapted to be slipped sidewise over said neck, beneath said bead, said loop terminating in a curved tip for binding against said bead when the loop is slipped part way off said neck to prevent the loop from accidentally slipping completely off said neck.

ANN H. NATHO.